United States Patent [19]

Duffy

[11] Patent Number: 5,029,513

[45] Date of Patent: Jul. 9, 1991

[54] VARIABLE-ORIFICE, SERVO-SOLENOID VALVE FOR A VARIABLE-ASSIST POWER STEERING SYSTEM

[75] Inventor: James J. Duffy, Livonia, Mich.

[73] Assignee: Ford Motor Company, Dearborn, Mich.

[21] Appl. No.: 515,926

[22] Filed: Apr. 27, 1990

[51] Int. Cl.⁵ ............................................... F15B 13/04
[52] U.S. Cl. .......................................... 91/31; 60/401;
 60/463; 91/375 A; 91/467; 180/143; 251/282
[58] Field of Search ................. 60/384, 400, 401, 463;
 91/31, 375 A, 467, 47; 251/30.04, 282; 180/141, 143

[56] References Cited

U.S. PATENT DOCUMENTS

| | | | |
|---|---|---|---|
| 2,690,192 | 9/1954 | Dannhardt | 251/30.04 X |
| 4,119,172 | 10/1978 | Yanagishima et al. | 60/434 X |
| 4,274,504 | 6/1981 | Kawabata et al. | 180/143 |
| 4,311,161 | 1/1982 | Narumi et al. | 180/143 X |
| 4,410,058 | 10/1983 | Dymond | 60/463 X |
| 4,561,521 | 12/1985 | Duffy | 180/142 |
| 4,570,736 | 2/1986 | Waldorf | 180/143 |
| 4,644,846 | 2/1987 | Kozuka | 91/31 |
| 4,702,335 | 10/1987 | Cage et al. | 180/143 X |
| 4,730,687 | 3/1988 | Chikuma et al. | 91/375 A X |
| 4,765,428 | 8/1988 | Kawakami et al. | 91/375 A X |
| 4,768,604 | 9/1988 | Schipper | 91/375 A X |
| 4,809,746 | 3/1989 | Wolfges | 251/282 X |
| 4,852,462 | 8/1989 | Uchida et al. | 91/375 A |
| 4,858,713 | 8/1989 | Kawakami et al. | 91/375 A X |
| 4,865,147 | 9/1989 | Uchida | 180/141 |
| 4,877,099 | 10/1989 | Duffy | 180/142 |
| 4,905,784 | 3/1990 | Yamashita | 91/375 A X |
| 4,958,695 | 9/1990 | Uchida et al. | 180/143 X |

Primary Examiner—John T. Kwon
Assistant Examiner—John Ryznic
Attorney, Agent, or Firm—Frank C. McKenzie; Keith L. Zerschling

[57] ABSTRACT

A power steering system for a wheeled vehicle comprising a fluid motor connected to dirigible wheels of the vehicle, a power steering pump and a steering valve structure situated in flow delivery and flow return passages that connect the pump with the fluid motor, the valve structure including a pilot-operated solenoid valve means that controls the bypass flow between the supply and return sides of the pump wherein a solenoid actuator is adapted to apply a vehicle speed sensitive force on a pilot valve portion of the valve which develops valve actuating forces on a flow control portion of the valve wherein the latter is speed conscious only and does not depend upon flow to and from the pump nor upon the steering pressure for the fluid motor.

15 Claims, 9 Drawing Sheets

VARIABLE-ORIFICE, SERVO-SOLENOID VALVE FOR A VARIABLE-ASSIST POWER STEERING SYSTEM

BACKGROUND OF THE INVENTION

My invention is adapted for use in a variable-assist power steering system such as that shown in U.S. Pat. Nos. 4,561,521 and 4,570,736. It may be used as well in a steering system such as that shown in U.S. Pat. No. 4,877,099. These prior art patents are assigned to the assignee of my invention.

Each of the steering systems described in these patents includes a rotary steering valve that controls fluid flow from the pressure side of a power steering pump to the return side, thereby controlling pressure distribution to a double-acting fluid motor which, in turn, is connected through a steering linkage to the dirigible wheels of a vehicle. The pump is a positive-displacement, constant-flow pump.

The steering valve comprises an inner valve member and a surrounding sleeve valve element which are formed with cooperating rotary valve lands. The sleeve valve element is connected to the pinion of a rack-and-pinion steering gear assembly, the fluid motor being adapted to apply a pressure assist to the steering rack.

Steering wheel torque causes rotary displacement of the inner valve member relative to the sleeve valve element. The amount of the relative rotary displacement is equal to the torsional twist of a torsion bar connection between the steering torque input shaft and the pinion of the steering gear assembly. Because of the constant flow delivered by the pump, displacement of the inner valve member relative to the sleeve valve element causes a steering pressure to be developed on one side of the fluid motor or the other depending upon the direction of the torsional displacement of the torsion bar connection.

The rotary valve lands provide a variable flow area for the fluid delivered from the pump. The steering pressure on one side of the fluid motor or the other is increased in accordance with the reciprocal of the square of the effective flow area across the valve lands, assuming that the power steering pump delivers a constant flow.

In the case of a variable-assist power steering system, a set of high-speed valve lands is provided in addition to a set of low-speed valve lands so that the flow metering area available when both sets of valve lands are operable is greater. This condition exists during high-speed operation. Therefore, at high speeds of operation, a greater degree of relative valve land displacement is required to produce any given steering pressure.

In a system of the kind shown in the ,521 prior art reference patent referred to above, fluid is distributed to the sets of high-speed valve lands through an actuator valve when the vehicle speed exceeds a predetermined value. The actuator valve is a solenoid-operated valve wherein the solenoid forces act directly on the valve element itself. In the case of the system shown in the '736 patent, an electric actuator controls the movement of the actuator valve, the actuator being in the form of a stepper motor which adjusts the valve linearly in one direction or the other depending upon the direction of rotation of the stepper motor. The stepper motor is controlled by an electronic control module that receives a vehicle speed signal.

An electronic actuator in the form of a stepper motor is relatively complex and costly and, in some instances, provides packaging problems in a vehicle having limited space for vehicle accessories in the transmission and engine compartment. In the case of a solenoid-actuated valve of the design shown in the '521 patent, the solenoid forces act directly on the valve, thus making it necessary to use a large solenoid to produce the necessary forces to balance the flow and spring forces on the valve.

BRIEF DESCRIPTION OF THE INVENTION

My improved valve structure comprises an actuator valve characterized by a variable orifice that eliminates the packaging and cost disadvantages of a stepper motor actuator or an actuator with a large, direct-acting solenoid for the high-speed flow control valve. It also decreases the response time as the steering system responds to changes in vehicle speed and to the demand for changes in steering pressure during turning maneuvers. It also counteracts any undesirable variable flow jet reaction forces on the valve element which could adversely affect the calibration of the valve.

I have accomplished these design objectives by providing an actuator valve assembly having a valve sleeve that forms a control valve spool for varying the flow delivered through the high-speed fluid delivery passage of the variable-assist steering gear system. A pilot valve is concentrically disposed within the main actuator valve spool. The actuator valve spool functions as a variable orifice to provide a desired relationship between total area for metering the pump flow and the torque on the torsion bar at all vehicle speeds. The variable orifice is in series relationship with respect to the high speed valve lands on the steering valve, thus modifying the effective throttling areas for the steering system. The main valve spool position is primarily controlled by the pilot valve because of an inherent, null-seeking position feedback characteristic as the solenoid applies a speed-sensitive force to the pilot valve.

The steering feel experienced by the driver is a sensation of gradual change throughout the entire torsional deflection range of the torsion bar.

If my invention is adapted for a variable-assist power steering system such as that shown in the '099 patent, the valve spool would control the flow from the pressure side of the pump to the return side instead of controlling fluid distribution to the steering valve through a high-speed flow passage. The function of the pilot-operated actuator valve in an environment such as that of the '099 patent would essentially be similar to its function in the system described above since the spool valve would be subjected to the same variable fluid flow forces due to the jet reaction effect or Bernoulli effect that would create self-closing valve forces.

BRIEF DESCRIPTION OF THE DRAWINGS

FIG. 3 is a schematic representation of the flow circuit for the steering valve in an environment such as that shown in FIG. 1.

FIG. 6 is a view similar to FIG. 4 showing the relative positions of the valve elements during a high-speed right turn steering maneuver.

PARTICULAR DESCRIPTION OF THE INVENTION

Figure 1:
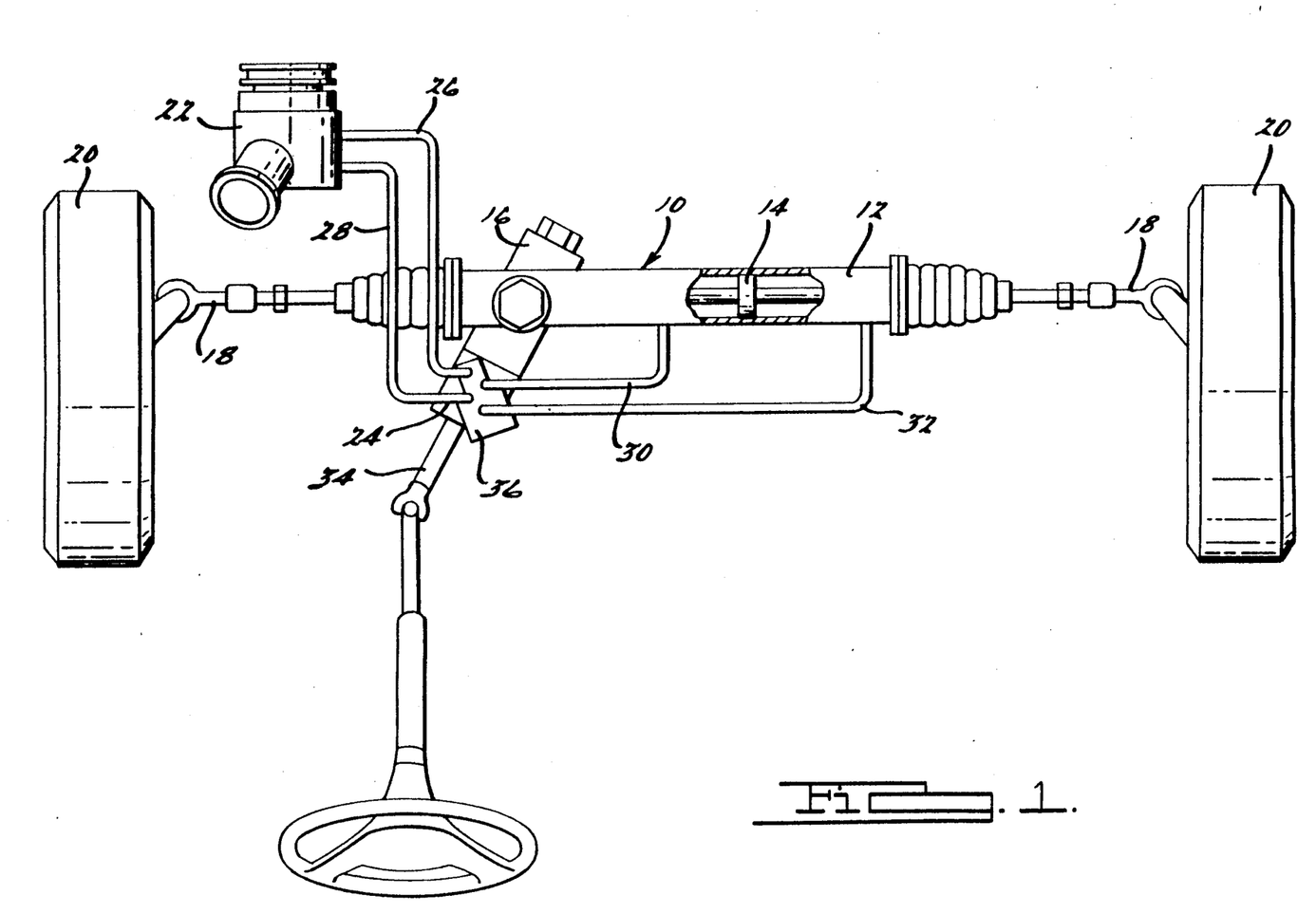
FIG. 1 is a schematic representation of a variable-assist power steering system in an automotive vehicle including a rack-and-pinion power steering fluid motor and a constant displacement power steering pump.

FIG. 1 shows a power steering rack and pinion mechanism 10 having a power cylinder 12 and a piston 14 which is connected to a rack that meshes with a pinion located in pinion housing 16. The piston is connected also to tie rods 18 for dirigible wheels 20.

A power steering pump, which is powered by the vehicle engine, is shown at 22. It delivers fluid to the steering valve 24 through a pressure delivery conduit 26. Fluid is returned to the pump through the return passage 28. The pump is a constant flow, positive displacement pump. Such pumps are well known in the motor vehicle industry.

Fluid is distributed to a right-turn pressure delivery passage 30 and to left-turn pressure delivery passage 32, thereby actuating the piston to provide a steering assist during turning maneuvers as steering torque is applied to a pinion by steering torque input shaft 34.

The actuator valve of my invention is mounted on the steering valve housing, as shown at 36 in FIG. 1.

The Steering Gear

Figure 2:
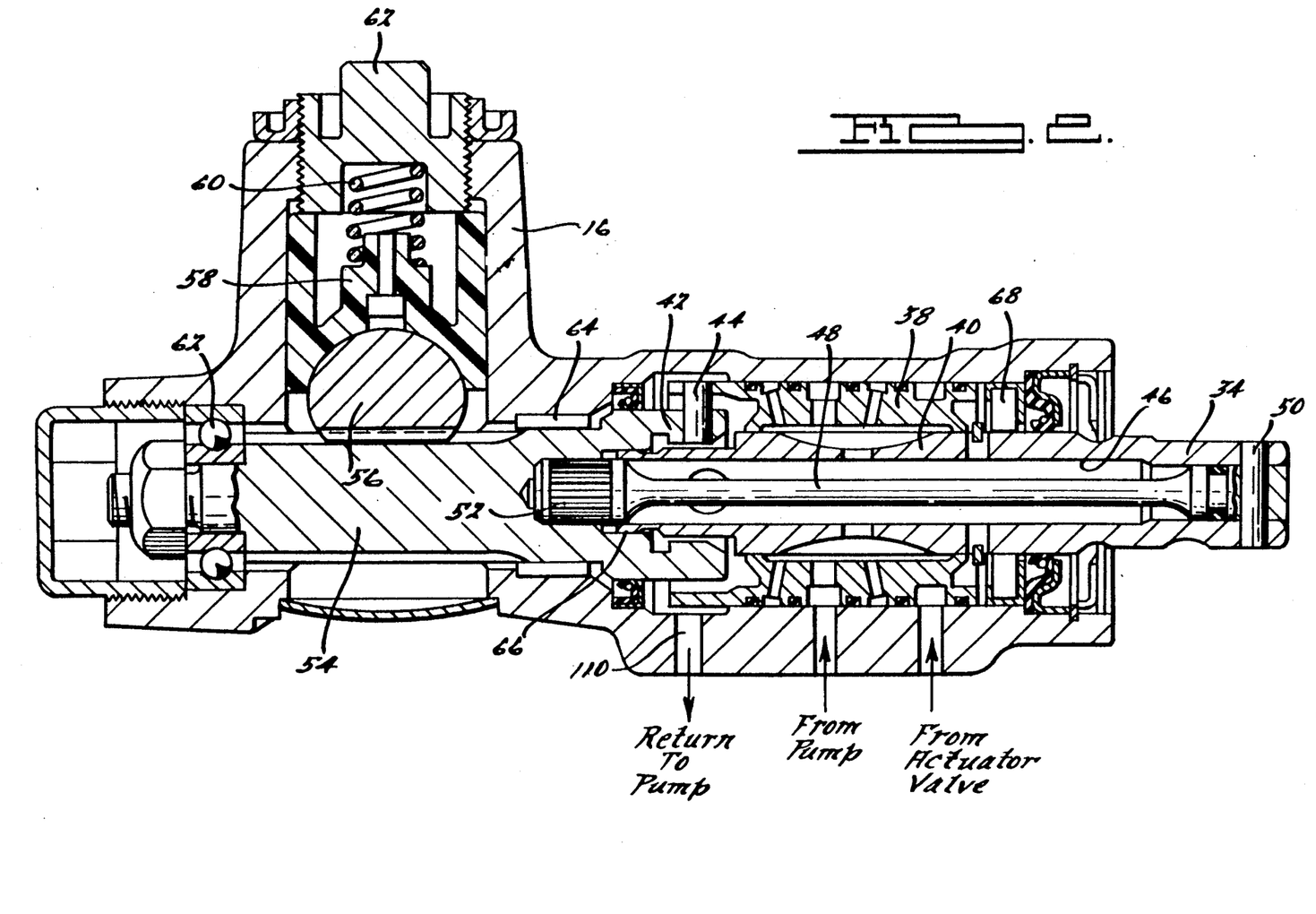
FIG. 2 is a cross-sectional view of the steering valve and the rack-and-pinion portion of the steering system.

The steering gear is shown in longitudinal cross section in FIG. 2. It comprises a valve sleeve 38 and inner valve member 40. Valve member 40 and valve sleeve 38 are provided with registering external and internal valve lands, as will be described with reference to FIGS. 4, 5 and 6.

Inner valve member 34 forms a part of torque input shaft 34. Valve sleeve 38 is connected at its left-hand end, as viewed in FIG. 2, to a pinion extension 42 by means of a pin 44. A limited degree of relative angular movement between the valve member 40 and the pinion may be accommodated.

The valve member 40 is provided with a central opening 46 through which torsion bar 48 extends. The right-hand end of the torsion bar is pinned as shown at 50 to the torque input shaft 34. The left-hand end is splined at 52 to the pinion, the latter being identified by reference character 54.

The pinion is formed with pinion teeth that engage rack teeth formed on rack 56, which is connected to or forms a part of the piston rod for the piston 14.

Spring-loaded yoke 58 holds the rack in meshing engagement with the pinion to provide a zero backlash condition. The yoke is urged into sliding engagement with the rack by spring 60, which is seated on a spring seat 62 threadably connected to the tower portion of the housing 16.

The bearing 62 journals the left end of the pinion 54 in the housing 16. A companion bearing 64 journals the right-hand end of the pinion.

The left-hand end of the inner valve member 40 is piloted in a pilot opening formed at the right-hand end of the pinion, as shown at 66. The right-hand end of the inner valve member is journalled by bearing 68 in the housing 16.

When torque is applied to the steering torque input shaft 34, a driving torque is delivered to the pinion 54 through the torsion rod 48, causing the rod to deflect through an angular displacement that is proportional to the torque applied. This causes relative movement of the inner valve member with respect to the outer valve sleeve.

Variable-Assist Steering System

As seen in FIG. 3, the inner valve member 40 is provided with a pair of low-speed external valve lands, one pair being shown at 70 and 72. Inner valve member 40 is provided also with a pair of high-speed external valve lands, one pair being shown at 74 and 76. A steering pressure supply passage supplies constant flow from the steering pump 22 to a steering pressure low-speed inlet port 78, the steering pressure supply passage being identified by reference numeral 80. The steering pressure passage 80 forms parallel flow paths, the flow path to a companion low-speed pressure inlet port being through passage 82.

High-speed flow passage 84 extends from the outlet side of pump 22 and through the variable-orifice valve 86 to delivery passage 88. That passage communicates with a first high-speed inlet pressure port 90, which communicates through passage 92 with a second high-speed pressure inlet port that is 180° out of position with respect to the port 90.

The variable-orifice valve 86 is controlled by an electronic control module 94 which receives a vehicle speed signal from sensor 96. The variable-orifice valve 86 is actuated by a solenoid actuator 98 which is energized by the module 94.

At low vehicle speeds, the orifice valve is closed, thereby interrupting flow from passage 84 to passage 88. The variable-orifice valve gradually opens to permit a variable flow to the high-speed inlet ports as the vehicle speed increases.

The Steering Valve

Figure 4:
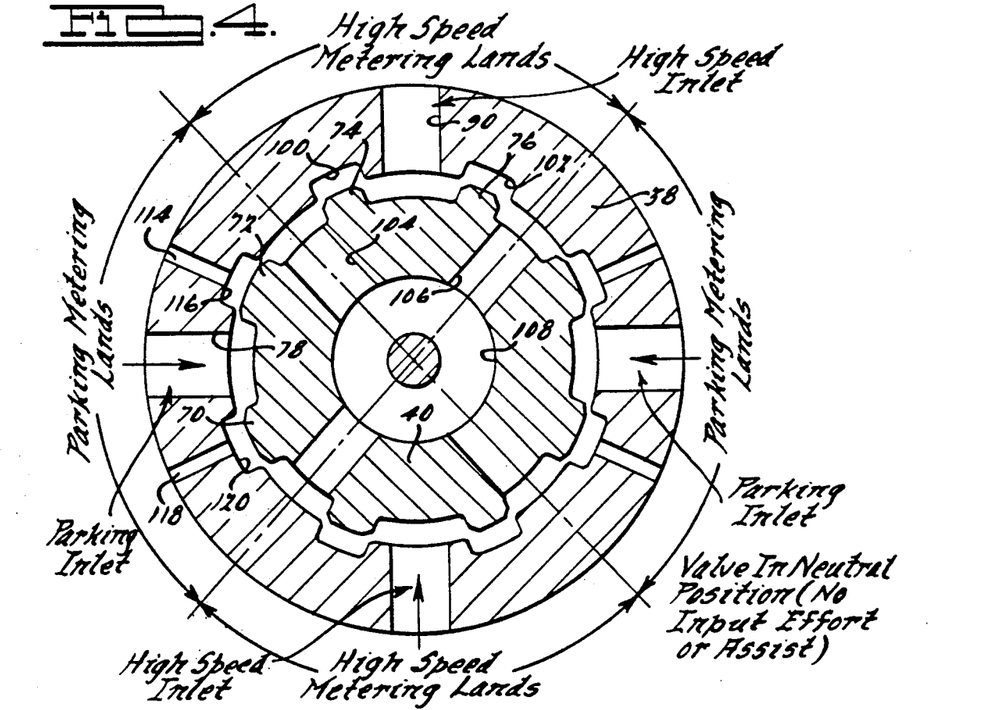
FIG. 4 is a detail cross-section view of the steering valve of FIG. 2 showing the relative positions of the valve sleeve and the internal valve member when the valve elements are in the neutral position and no steering torque is applied to the torsion bar.
Figure 5:
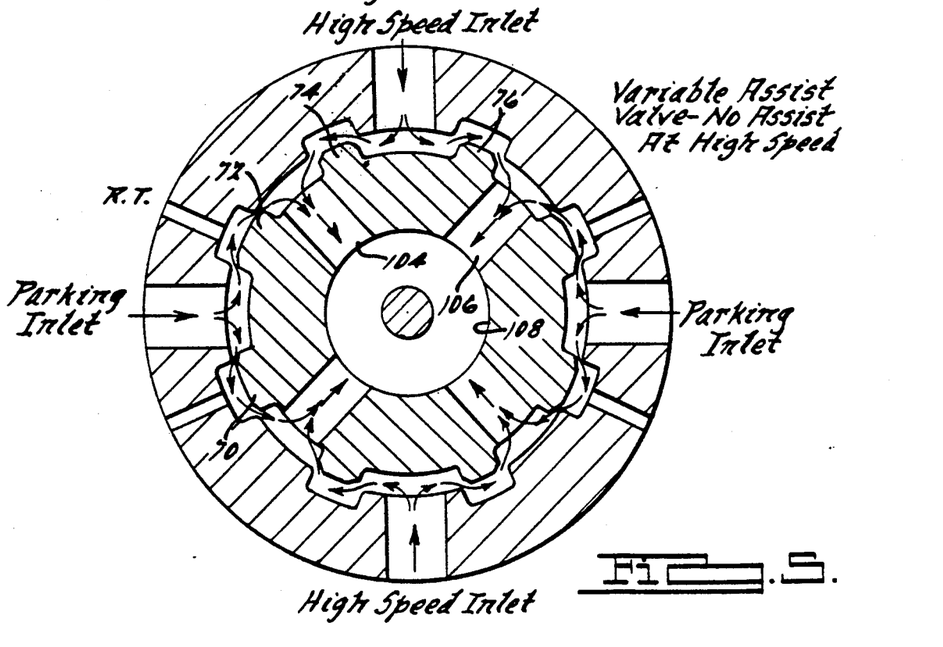
FIG. 5 is a view similar to FIG. 4 showing the relative positions of the valve elements during straight-ahead driving with no assist at high speeds.

The construction of the steering valve is best seen by referring to FIGS. 4, 5 and 6. In FIG. 4, the inner valve member 40 and the outer valve sleeve 38 are shown in their relative position when the valve is in the neutral condition with no steering torque applied. The high-speed inlet port 90 is situated directly between external valve lands 74 and 76. These lands, in turn, register with internal valve land grooves 100, 102, respectively. Fluid entering the port 90 is free to pass over the lands 74 and 76 to radial outlet ports 104 and 106, respectively. These radial outlet flow ports communicate with the central passage 108 formed in the inner valve member 40. That central passage 108 communicates with the flow return port 110, formed in the valve housing as shown in FIG. 2. Port 110 communicates with flow return passage 112, as shown in FIG. 3, which leads to the flow inlet side of steering pump 22.

A right-turn steering pressure port 114 is provided in the outer valve sleeve 38 and communicates with internal land groove 116, as seen in FIG. 4. Groove 116 registers with an external land 72. Similarly, a left-turn pressure port 118 is formed in the valve sleeve 38 and communicates with internal land groove 120, the latter registering with external land 70 on the inner valve member 40.

In FIG. 6, I have shown the inner valve member displaced relative to the valve sleeve. In this condition, the vehicle is executing a high-speed right turn with variable-assist. It is seen in FIG. 6 that the flow area between land 72 and the adjacent internal valve land of the sleeve is restricted or closed and the adjacent flow area 124 is opened, thereby providing a greater degree of communication between right-turn pressure delivery port 114 and the low-speed inlet port 78. Similarly, the flow area 116 between land 74 and the adjacent internal valve land of the valve sleeve 40 is restricted, as is the flow area 118 between land 76 and its adjacent land of the valve sleeve 40. Thus, the flow from the high-speed inlet port 90 to the radial flow return ports 104 and 106 is restricted. This results in a higher pressure in the right-turn delivery passage 114.

Similarly, the degree of communication between left-turn pressure delivery passage 118 and radial flow return port 126 is decreased as the flow area communicating with left-turn port 118 is decreased. Thus, the pressure differential between the right-turn pressure chamber of the fluid motor, as shown in FIG. 1, and the left-turn pressure chamber of the fluid motor is increased, thereby producing a pressure assist for the right-turn steering torque.

In a typical working embodiment of the invention, the flow area defined by the low-speed external valve lands will decrease to approximately zero with 2-½° travel of the inner valve member relative to the valve sleeve. The high-speed external valve lands of the inner valve member will approach a closed flow condition after the torsion rod is deflected approximately 4°. A total flow area for relative valve displacements between zero and 2-½° is equal to the sum of the two flow areas when the system is operating in the high-speed range with the variable orifice valve open. This condition is shown in FIG. 5 where the low-speed parking inlet port 126 communicates with internal passage 108 across the low-speed metering lands 70 and 72 of the inner valve member, and a high-speed inlet port 120 communicates with the internal passage 108 across the high-speed metering lands 74, 76.

As indicated in FIG. 5, the high-speed metering lands and the low-speed metering lands are demonstrated by the directional arrows which communicate with the radial passages 104 and 106. Minimal torque is applied to the valves when they assume the condition shown in FIG. 5, so the flow areas for the high-speed lands as well as the low-speed lands are open.

In the case of FIG. 6, the torque applied to the torsion bar is sufficient during a right-turn maneuver to cause the low-speed metering lands to close, thus interrupting flow across the low-speed metering lands 72, 70, while the high-speed metering lands 74, 76 remain in their throttling positions.

The Servo-Solenoid Valve

Figure 7:
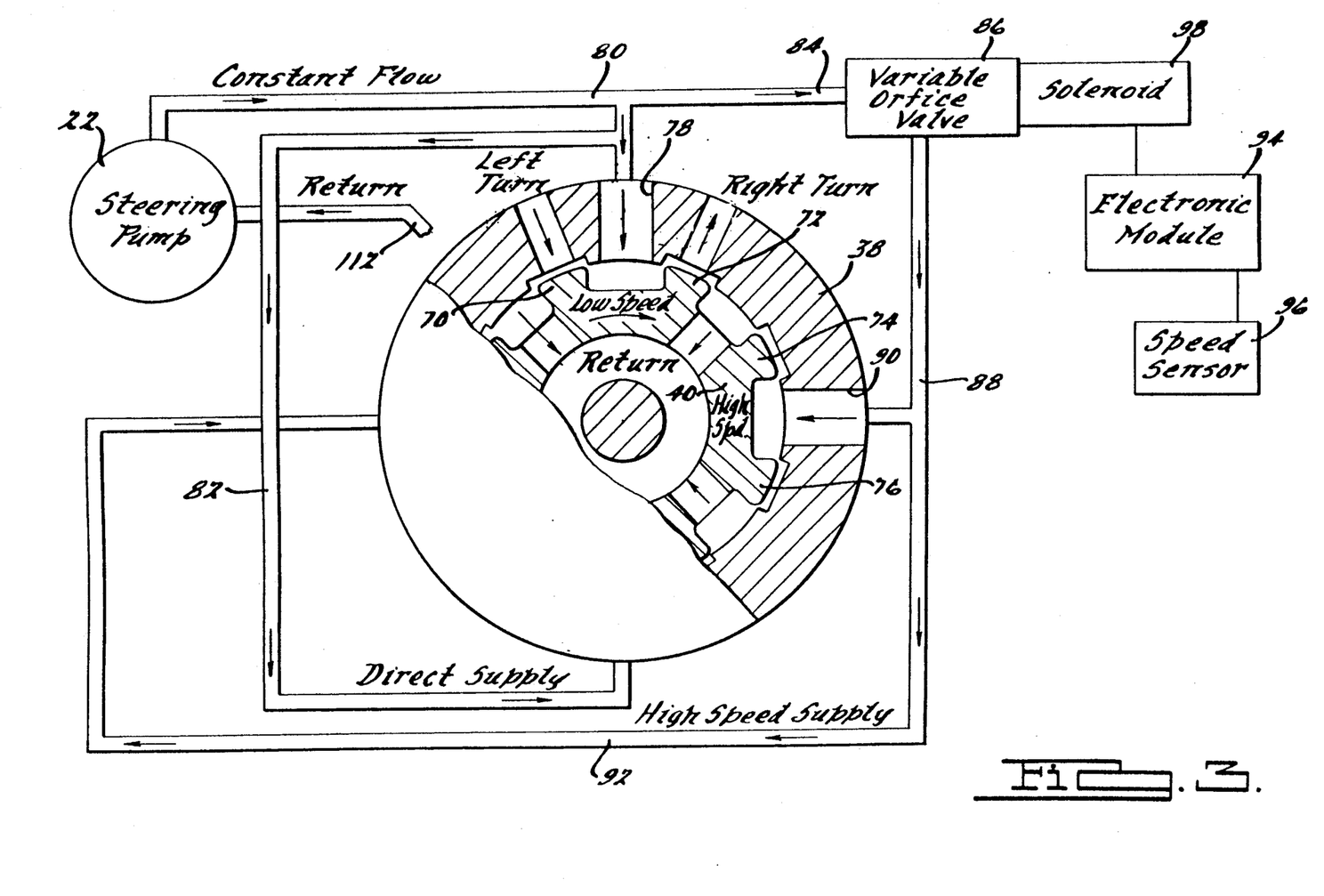
FIG. 7 is a cross-sectional view of the servo-solenoid, variable-orifice valve of my invention.

FIG. 7 shows in detail the servo-solenoid, variable-orifice valve that is shown only schematically in FIG. 3. The valve of FIG. 7 provides a variable orifice controlled by an electronic speed sensing module which produces a desired area and pressure versus steering torque relationship at all vehicle speeds. The orifice is in series with t he high-speed section of the valve. It thus is capable of modifying the throttling areas developed by the high-speed steering valve lands described above. This produces intermediate area and pressure versus torque relationships at vehicle speeds between the maximum speed and the lower speed at which the actuator valve is open. As will be explained subsequently, the valve is insensitive to changes in the inlet and outlet pressures for the valve and is insensitive to variable flow across the valve caused by steering maneuvers.

The servo-solenoid, variable-orifice valve of FIG. 7 is a normally open valve. It controls the flow between inlet passage 84 and outlet passage 88, which were described with reference to FIG. 3. A valve cavity 122 is formed in the housing 16. The solenoid 98 has a mounting plate 124 with an externally threaded stem 126 threadably received in a threaded portion of the opening 122 in the housing 16. Mounting plate 124 carries solenoid coil 128 which surrounds a solenoid pole 130 and a movable armature 132. Armature 132 is urged normally in the left-hand direction by spring 134, which is seated on a spring seat 136 that is adjustably threaded in the pole 130 and held in its adjusted position by lock nut 138.

The valve of FIG. 7 includes a fixed valve sleeve 140 threadably connected at 142 to the plate 124.

The outlet passage 88 is formed in the housing 16 as indicated. It communicates with radial ports 144 formed in the fixed sleeve 140. Port 144 is sealed with respect to the inlet passage 84 by O-ring seal 146 surrounding the sleeve 140.

Inlet passage 84 communicates with the space 148 on the left side of the valve sleeve 140. It communicates also with the central opening 150 for the sleeve 140 through radial port 152.

A variable-orifice valve sleeve 154 which is a main control valve element, is slidably positioned in the central opening 150 in the fixed sleeve 140. It normally is biased in the left-hand direction as viewed in FIG. 7 by valve spring 156, which is seated on spring seat 158 anchored against a shoulder and formed on the mounting plate 124 for the solenoid 98. Variable-orifice valve sleeve 154 is provided with three external valve lands 160, 162 and 164. These external valve lands register with internal valve lands formed in the fixed valve sleeve 140.

A pilot valve spool 166 is slidably positioned in valve opening 168 of the variable-orifice valve sleeve 154. Pilot valve spool 166 is provided with four axially spaced valve lands 170, 172, 174 and 176. These external valve lands register with cooperating internal valve lands formed in the variable-orifice valve sleeve 154. The right-hand end 178 of the pilot valve 166 is engaged by a stem 180 of the armature 132. The armature is biased into engagement with the end 178 by armature spring 134.

The armature 132 is provided with an internal through-passage 182 which equalizes the pressure on each side of the armature. Thus, the spring chamber for spring 134 communicates with the spring chamber for spring 156.

The spring chamber for spring 156 communicates with radial port 184 formed in the pilot valve element 166, the latter being provided with a central passage 186 which communicates with the left-hand end of the pilot valve element 166.

A pilot valve spring 188 is situated between the pilot valve element 166 and a spring seat 190 carried by and forming a part of the variable-orifice valve element 154. Thus, the spring chamber for the spring 188, the spring chamber for the spring 156 and the spring chamber for the spring 134 are subjected to the same pressure; namely, the pressure that exists in central passage 186.

External valve land 172 overlaps the internal valve element 154 with which it registers. Similarly, valve land 174 overlaps the internal valve land on the valve element 154 with which it registers. The amount of the overlap for land 172 is shown in FIG. 7 by the dimensional label $L_1$. Similarly, the degree of overlap for the land 174 is shown in FIG. 7 by the dimensional label $L_2$. Land 172 controls the degree of communication between radial port 192 and radial port 152 of the fixed valve sleeve 140, the latter, in turn, communicating with the inlet passage 84. Radial port 192 communicates with a central passage 186.

In a similar fashion, land 174 controls the degree of communication between radial port 192 and radial port 144 which, in turn, communicates with the outlet passage 88 through radial port 195. The degree of overlap for the land 174 is indicated by the dimensional assembly $L_2$. The degree of overlap for the land 174 is shown by the dimensional symbol $L_1$. The magnitude of the pressure in passage 186 will vary depending upon the ratio of $L_1$ to $L_2$.

The land 162 is provided with a tapered or conical periphery, which registers with internal land 194 formed in the fixed valve sleeve 140. This moderates the rate of change of orifice area upon adjustment of sleeve 154. The tapered land 162 and the metering edge of the registering valve land 194 define a variable flow orifice. As the valve sleeve 154 is urged to the right into closer registry with the surrounding metering land 194, the flow from inlet passage 84 to outlet passage 88 is progressively restricted. Movement of the valve sleeve 154 in the opposite direction reduces the flow restriction between inlet and outlet passages 84 and 88, respectively. The variable orifice defined by the variable-orifice valve and the surrounding land 194 is controlled by the position of the pilot valve which, in turn, responds to the force of the solenoid. A change in speed will result in a different solenoid force, thereby affecting the ratio of $L_1$ to $L_2$. Thus, the leakage flow across the overlapping lands identified by the symbols $L_1$ and $L_2$ varies, thereby changing the value of the pressure in the inner passage 186. This change in pressure is felt at the spring chamber for spring 156, which then adjusts the pressure differential across the variable-orifice valve spool 154 and corrects the position error. Thus, the variable-orifice valve spool and the pilot valve demonstrate a null-seeking characteristic whereby the pilot valve precisely controls the position of the sleeve 154. The same characteristic will accommodate and compensate for changes due to the tendency for a Bernoulli effect at the variable orifice to close the variable-orifice valve spool.

The flow metering effect at the variable orifice defined in part by land 162 produces a variable jet thrust which tends normally to close the variable-orifice valve spool. This phenomenon will be explained with reference to FIGS. 10, 11 and 12.

The force of the relatively small solenoid 98 acts against the spring 134 to establish the desired position for the pilot valve 166. As explained previously, the pilot valve 166 is pressure balanced since it is subjected to the same pressure at its left-hand end at its right-hand end.

For convenience in this description, the pressure in the central passage 186 is identified in FIG. 7 as pressure $P_2$. That pressure exists also in the spring chamber for spring 156. The pressure in the inlet passage 84 is identified as pressure $P_1$ and the pressure in the outlet passage 88 is identified by pressure $P_3$.

The spring 134, which is a solenoid spring acting on the armature, is identified in FIG. 7. The main spool spring is identified by numeral 156, and the return spring acting directly on the pilot valve spool 166 is identified by numeral 188. The pilot valve spool 166 has pressure $P_2$ acting on each of its ends. The main variable-orifice valve spool is forced to follow the position of the pilot valve spool. The forces that exist on the main variable-orifice valve spool are the spring force and the force of the pressure differential of the pressures $P_1$ and $P_2$. If the main variable-orifice valve spool does not maintain its correct position relative to the pilot valve spool, a position error occurs which increases or decreases the value for $P_2$. This causes a reduction in the position error to near zero.

Figure 10:
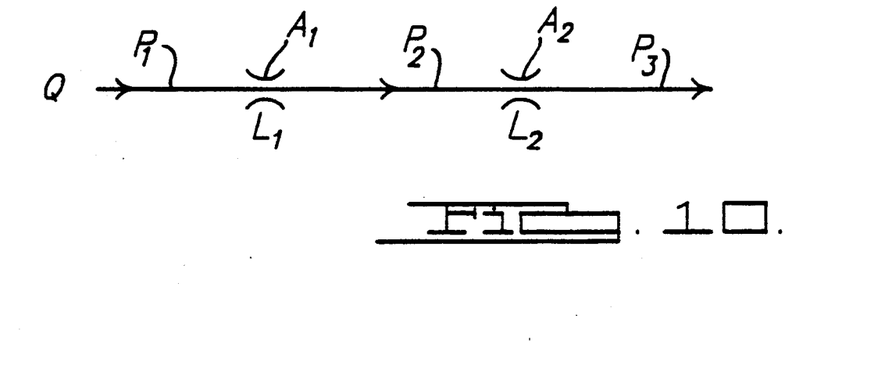
FIG. 10 is a schematic representation of the effective orifices developed by the overlapping valve lands of the pilot valve spool with respect to the main valve spool.

FIG. 10 is a schematic functional diagram illustrating how this pressure balance occurs. On the horizontal axis of FIG. 10, the flow symbol Q represents flow through the valve. Area A1 represents a flow restricting orifice that corresponds to the overlapping valve lands in FIG. 7 shown at $L_1$.

The pressure $P_1$ in FIG. 10 is the inlet pressure in passage 84. The pressure $P_2$ in FIG. 10 is the pressure $P_2$ on the downstream side of the overlapping valve lands at $L_1$. The symbol A2 is a variable area corresponding to the overlapping valve lands $L_2$ in FIG. 7, and the pressure $P_3$ in FIG. 10 is the pressure on the downstream side of the overlapping valve lands at $L_2$, which corresponds to the pressure in the outlet passage 88.

Because of the flow Q shown in FIG. 10, $P_1$ is equal to or greater than $P_2$ which is equal to or greater than $P_3$. If A1 is large and A2 is small, then $P_2$ approaches $P_1$. If A1 is small and A2 is large, $P_2$ approaches $P_3$. The pressure differential $P_2$ minus $P_3$ is represented by the equation A.

$$P_2 - P_3 = \frac{1}{(A_2/A_1)^2 + 1} (P_1 - P_3) \quad \text{(A)}$$

In the servo-solenoid valve of FIG. 7, the metal overlap at $L_1$ and at $L_2$ corresponding to the orifices A1 and A2 in FIG. 10 both have leakage flow. A small reduction in the overlap at $L_1$ or at $L_2$ causes an increase leakage flow, and vice versa. Thus, the overlap areas $L_1$ and $L_2$ act similarly to the function of the orifices A1 and A2 in FIG. 10. Thus, equation A can be rewritten in the following form as equation B:

$$P_2 - P_3 = \frac{1}{(L_1/L_2)^2 + 1} (P_1 - P_3) \quad \text{(B)}$$

Small changes in the ratio of $L_1$ over $L_2$ cause large changes in $P_2$. Thus, when a small position error occurs because the variable-orifice valve spool fails to follow the motion of the pilot valve spool 166, the ratio of $L_1$ over $L_2$ and $P_2$ are affected so that the position error is maintained near zero.

If variable flow jet Bernoulli reaction forces on the main valve spool introduce position errors that affect the ratio of $L_1$ to $L_2$, and the value of $P_2$, any position error caused by those forces would be relatively small.

Figure 11:
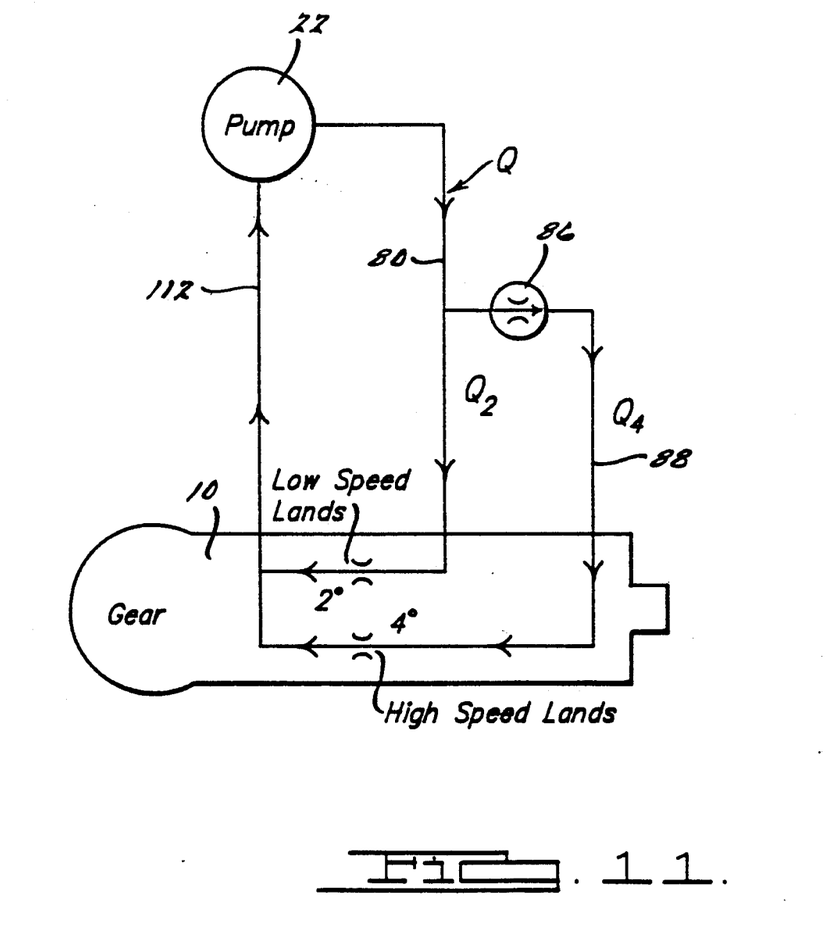
FIG. 11 is a schematic representation of a power steering system including the variable-orifice valve actuator of my invention.

In order to explain the effect of the Bernoulli forces that tend to close the valve, reference will be made to FIGS. 11 and 12. In FIG. 11, the principal elements of the system are shown in line diagram form. Flow from the pump 22 is distributed to the gear through passage 80, and fluid is returned from the gear to the pump through the passage 112. If it is assumed that the vehicle is cornering at a constant speed, the low-speed orifice closes when the relative position of the inner and outer valve members of the steering valve is at about 2°. The high-speed valve closes at about 4°, as indicated on the diagram. An increase in flow under these conditions, which is represented by the symbol $Q_4$, tends to close the actuator valve because of the Bernoulli effect; but at a constant speed, the valve should remain fixed. This is exactly what happens because of the pressure balance feature described previously. The tendency to produce an unbalanced Bernoulli force on the valve spool results from the flow jet represented by the vector 200 in FIG. 12.

Figure 12:
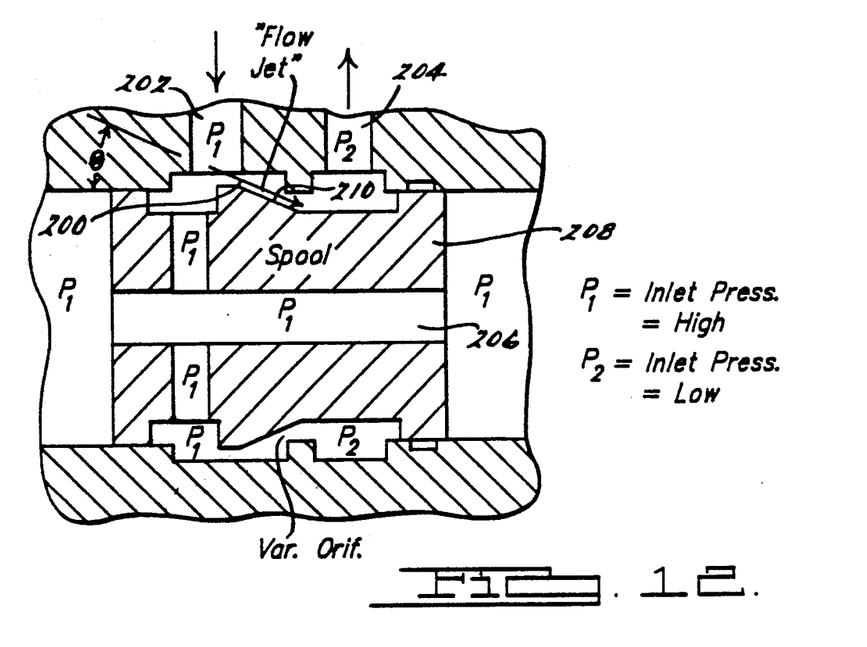
FIG. 12 is a schematic representation of a valve spool and a surrounding valve sleeve that illustrates the manner in which the flow jet reaction forces develop in a valve spool which tend to develop an unbalanced force but which are counteracted by the servo-solenoid valve of my invention.

FIG. 12 is a schematic representation of a conventional valve spool that controls distribution of fluid from an inlet passage 202 to an outlet passage 204. If it is assumed that the inlet pressure $P_1$ in passage 202 is distributed through a central passage 206 of a conventional valve spool 208, and if it is assumed that the central passage 206 communicates with both sides of the valve spool, pressure force on the valve spool 208 will be balanced. However, because of the jet reaction force at the flow metering area 210, an additional pressure force is introduced and tends to upset the position of the valve spool with respect to the sleeve. $P_2$ is the outlet pressure in passage 204, which is on the downstream side of the orifice 210. A flow jet reaction force is developed and is equal to a value determined by the equation C.

$$\text{Flow Jet Reaction Force} = (.024Q \sqrt{P_1 - P_2})\cos\theta \quad \text{(C)}$$

The force unbalance produced by the flow jet reaction force tends to close the orifice 210.

The pilot valve spool 166 has its position controlled only by the solenoid. It has no net pressure force due to a pressure differential acting on it. The position of the pilot valve relative to the position of the variable-orifice valve thus is constant as $L_1$ and $L_2$ tend to seek their neutral, null values. Thus, the position of the variable-orifice valve will be precisely controlled in response to the control forces developed by the control solenoid without reference to any calibration errors resulting from the Bernoulli effect. Any tendency for the Bernoulli forces to close the variable-orifice solenoid valve spool will result in a change in the ratio of $L_1$ over $L_2$, which increases the value of $P_2$. That, in turn, compensates for and opposes the force on the variable-orifice valve spool due to the Bernoulli effect, so the net result is an insensitivity of the flow controlling characteristics of the valve to changes in the rate of flow through the variable orifice.

Figure 8:
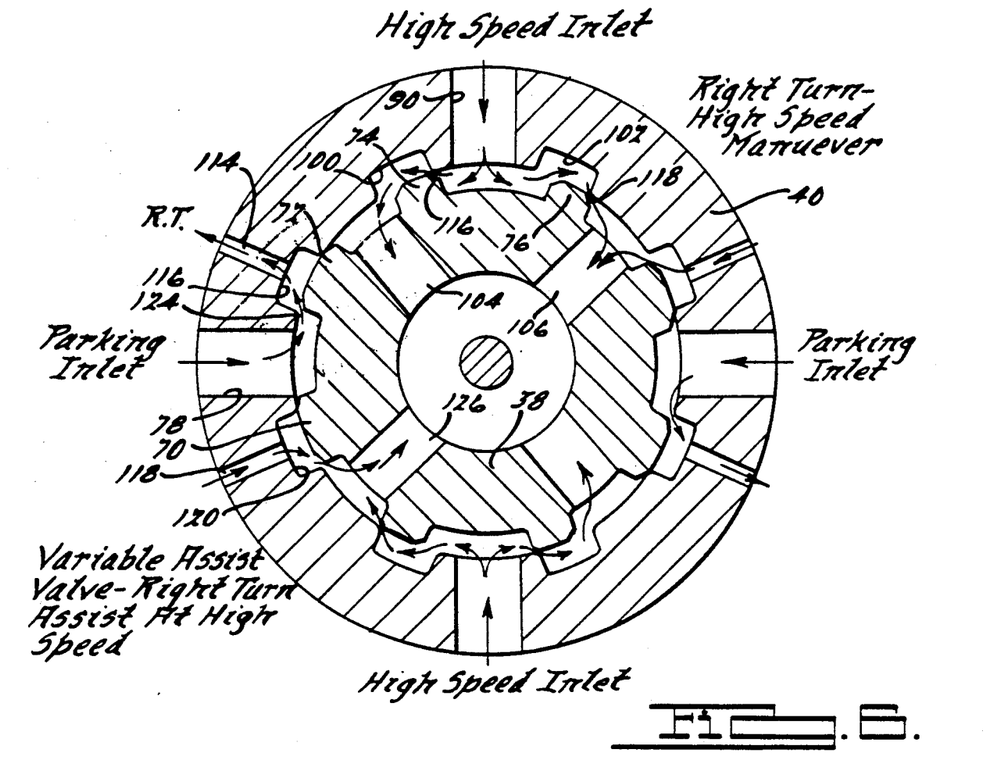
FIG. 8a is a schematic diagram of a portion of the pilot valve spool and the main valve spool which illustrates the area relationship of the overlapping valve lands.
FIG. 8b is a chart showing the relationship between the area of the overlap of the valve spools with respect to the pressure differential across the valve.
Figure 8A:
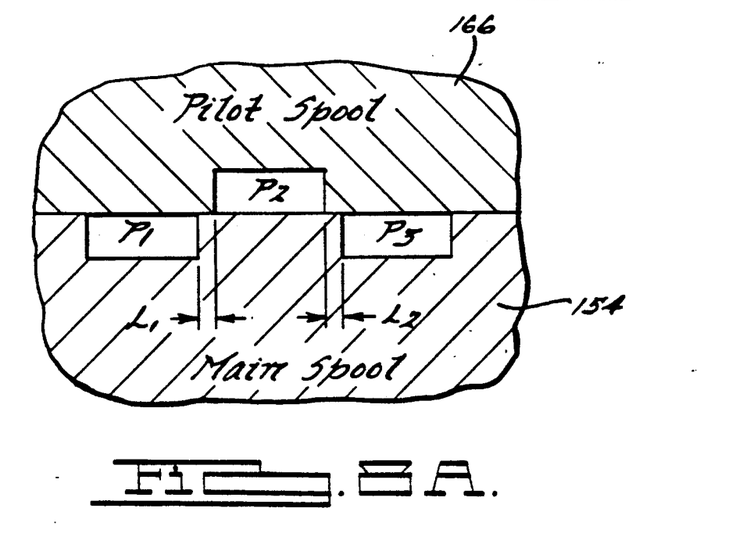
Figure 8B:
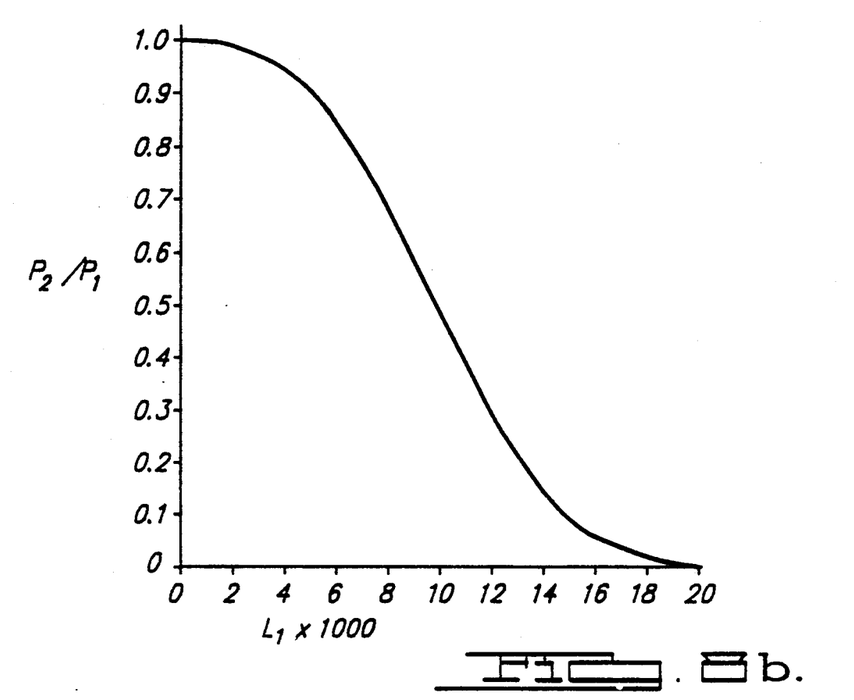
Figure 9:
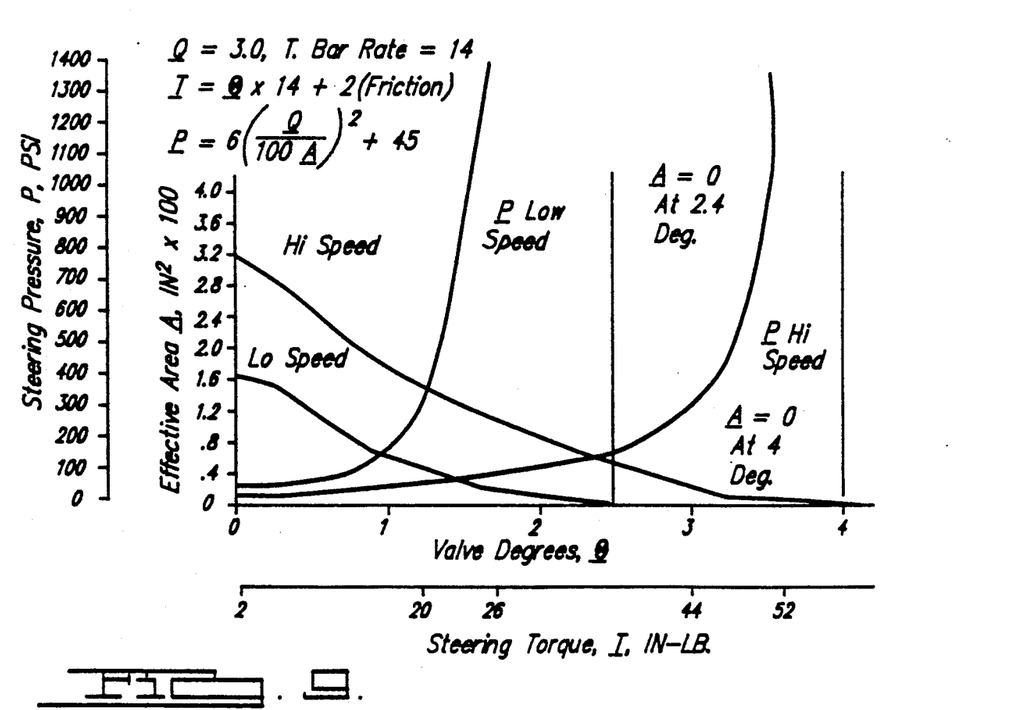
FIG. 9 is a chart showing the relationship between steering torque and steering pressure in a variable-assist power steering system of the kind shown in the '521 and '736 patents.

FIG. 8b shows a plot that demonstrates the relationship between the pressure ratio $P_2$ over $P_1$ and the overlap $L_1$. A one-to-one pressure relationship, of course, will result from a zero overlap. A very reduced ratio of $P_2$ divided by $P_1$ will result from maximum overlap. In most instances, the valve assembly will operate in the central, straight-line part of the curve.

For purposes of understanding the derivation of the chart of FIG. 8b, reference may be made to FIGS. 8a and 10 of the main valve spool. A control valve groove on the left side of the overlap $L_1$ is subjected to inlet pressure $P_1$. Pressure $P_3$ in the outlet passage 88 exists on the right-hand side of the overlap area $L_2$.

FIG. 10 shows the analogy discussed previously, where the area of the orifice defined by the first overlap is identified as A1, and the corresponding area defined by the second overlap $L_2$ is identified by the symbol A2. It is assumed that the ratio of A2 to A1 is equal to the ratio of $L_1$ to $L_2$ when the valve elements are functioning in the manner intended. If this is the case, $P_2$ is determined by equation D.

$$P_2 = P_1 \times \frac{1}{\left(\frac{a_2}{a_1}\right)^2 + 1} = \frac{P_1}{\left(\frac{L_1}{L_2}\right)^2 + 1} \quad \text{(D)}$$

If it is assumed that $L_1 + L_2 = 0.020''$, $P_2$ equals:

$$P_2 = P_1 \times K = \frac{P_1}{\left(\frac{L_1}{.02 - L_1}\right)^2 + 1} \quad \text{(E)}$$

Thus, the ratio $P_2$ to $P_1$ equals:

$$\frac{P_2}{P_1} = \frac{1}{\left(\frac{L_1}{.02 - L_1}\right)^2 + 1} \quad \text{(F)}$$

FIG. 8b is the plot of equation F.

Shown in FIG. 7 is a dirt ring groove 230 formed in the fixed valve sleeve 140. This dirt ring groove is located directly adjacent outlet port 144 which registers with valve land 164. When the land 164 is shifted in a left-hand direction, it is possible for contaminants in the oil to collect in the dirt ring groove because of the pressure differential across the valve land. Subsequent movement during the operating cycle of the valve land 164 in the right-hand direction then will tend to uncover the dirt ring groove, allowing the dirt to be discharged into the lower pressure fluid path as it moves past the registering valve lands into the outlet passage 88. Thus, fluid initially existing in the fluid has little opportunity to collect in the area occupied by the main valve spool because, upon movement of the main valve spool, the pressure differential across the valve land will cause it to accumulate in the dirt vent groove. As soon as the registering external valve land uncovers the dirt vent groove, the dirt has an opportunity to be expelled through the fluid circuit. This helps to prevent valve sticking.

Bypass Variable-Assist Steering Gear

Figure 13:
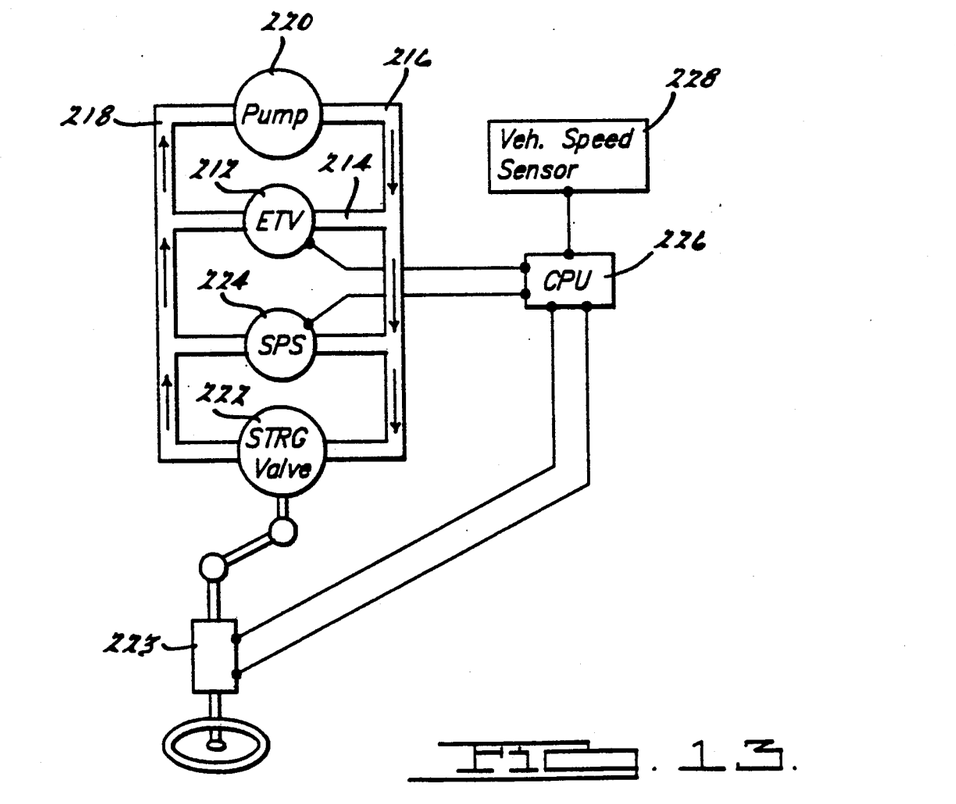
FIG. 13 is a schematic representation of a variable-assist steering gear in which my improved valve assembly is used to control bypass flow across a power steering pump.

In FIG. 13, I have shown an electronically controlled, variable-assist, power steering system of the kind shown in U.S. Pat. No. 4,877,099. Unlike the steering system shown in U.S. Pat. Nos. 4,561,521 and 4,570,736, the steering system of the '099 patent has an electronically controlled throttling valve 212 located in a bypass flow passage 214 between the flow discharge passage 216 and the flow return passage 218 of a positive displacement constant-flow pump 220.

A steering gear valve corresponding to the low-speed steering valve of the embodiment of FIG. 1 is shown at 222. It receives fluid under pressure from passage 216 and distributes pressurized fluid to either one side or the other of a rack-and-pinion steering mechanism of the kind shown in FIG. 1.

A steering torque sensor 223 develops a steering torque signal and steering pressure sensor 224 develops a pressure signal that is proportional to the difference in the pressure between the inlet side of the pump and the outlet side of the pump. Pressure sensor 224 delivers a pressure signal to an electronic central processor unit 226 which uses the pressure signal, together with the vehicle speed signal from sensor 228, to deliver control voltage to the electronic throttling valve 212. The throttling valve 212 may be of the kind that is described herein with reference to the embodiment of FIGS. 2 and 3, although in the embodiment of FIG. 13, it is used to control the bypass from the high pressure side of the pump to the low pressure side, whereas in the embodiment of FIGS. 2 and 3, it is used to control the flow through the high-speed pressure passage to the high-speed ports of the steering valve.

The steering valve 222 may be of the well known type. It does not require a high speed section and a distinct low speed section. It may resemble, for example, the steering valve shown in U.S. Pat. No. 4,063,490.

In the case of the FIG. 13 embodiment, the flow inlet side that communicates with the high pressure side of the pump 220 would correspond to passage 84 in the embodiment of FIG. 7. The outlet side of the throttling valve 212, which communicates with the return side of the pump 220, would correspond to passage 88 in the embodiment of FIG. 7.

Overview

Regardless of whether the variable-orifice, solenoid-operated valve of my invention is used in a system such as that shown in FIG. 7 or in a system such as that shown in FIG. 13, the overlap areas $L_1$ and $L_2$ tend to remain equal, one with respect to the other. The valve is a null-seeking controller which forces the variable-orifice valve spool to follow the motion of the pilot valve with a position feedback characteristic. The pilot valve itself is fully balanced hydraulically. Only leakage flow occurs across the pilot valve. The variable-orifice valve lands form an area control rather than a pressure control.

The solenoid may be a pulse-width modulated solenoid which responds to the electronic module signal with minimal influence due to friction and inertia forces.

Having described a preferred embodiment of my invention, what I claim and desire to secure by U.S. Letters Patent is:

1. A fluid motor circuit having a pump, a pressure operated mechanism that responds to pressure developed by said pump and fluid flow passages between said pump and said pressure operated mechanism;

first valve means communicating with said passages for controlling pressure distribution to said pressure operated mechanism;

second valve means comprising a main flow control valve element in one of said passages for controlling flow through said one passage and having a flow inlet port and a flow outlet port;

said second valve means comprising also a pilot valve element and a valve sleeve, said main control valve element and said sleeve having main registering valve lands defining a variable area orifice forming a flow path between said inlet port and said outlet port, said pilot valve element and said main control valve element having other registering valve lands defining a variable restriction means communicating with said inlet port for developing a main valve element position feedback pressure;

valve passage means for distributing said feedback pressure to one side of said main control valve element;

and a solenoid actuator having an armature adapted to create a pilot valve element actuating force on said pilot valve element whereby said control valve element follows the displacement of said pilot valve element in response to variations in the force applied by said solenoid actuator.

2. A power steering system having a pressure operated fluid motor, a power steering pump, fluid flow passages between said pump and said fluid motor;

a manually operated steering valve means for controlling pressure distribution to said pressure operated mechanism;

second valve means comprising a main control valve element in one of said passages for controlling flow through said one passage including a flow inlet port and a flow outlet port;

said second valve means comprising also a fixed sleeve, said main control valve element and said sleeve having main registering lands defining a variable area orifice forming a flow path between said inlet port and said outlet port;

a pilot valve element, said pilot valve element and said main control valve element having, registering lands defining a variable restriction communicating with said inlet and outlet ports for developing a main valve element position feedback pressure;

valve passage means for distributing said feedback pressure to one side of said main control valve element;

and a solenoid actuator having an armature adapted to create a pilot valve actuating force on said pilot valve whereby said control valve element follows the displacement of said pilot valve element in response to variations in the force applied by said solenoid actuator.

3. A fluid motor circuit for a wheeled vehicle having a positive-displacement, constant-flow pump, a pressure-operated steering mechanism that responds to pressure developed by said pump and parallel high vehicle speed and low vehicle speed fluid flow passages between said pump and said pressure operated mechanism;

steering valve means in said passages for controlling pressure distribution to said pressure operated mechanism;

variable-orifice valve means comprising a main flow control valve element in one of said parallel passages for controlling the flow through said one passage and having a flow inlet port and a flow outlet port;

said variable-orifice valve means comprising also a fixed valve sleeve, said main valve element and said sleeve having main registering valve lands defining a variable-area orifice in said one passage;

a pilot valve element, said pilot valve element and said main control valve element having other registering lands defining a variable restriction communicating with said inlet and outlet ports for developing a main valve element position feedback pressure;

valve passage means for distributing said feedback pressure to one side of said main control valve element;

and a solenoid actuator having an armature adapted to create a pilot valve element actuating force on said pilot valve element whereby said control valve element follows the displacement of said pilot valve element in response to variations in the force applied by said solenoid actuator.

4. A fluid motor circuit having a pump, a pressure operated mechanism that responds to pressure developed by said pump and fluid flow passages between said pump and said pressure operated mechanism;

first valve means communicating with said passages for controlling pressure distribution to said pressure operated mechanism;

second valve means comprising a main flow control valve element in one of said passages for controlling flow through said one passage and having a flow inlet port and a flow outlet port;

said second valve means comprising also a pilot valve element and a valve sleeve, said main control valve element and said sleeve having main registering valve lands defining a variable area orifice forming a flow path between said inlet port and said outlet port, said pilot valve element and said main valve element having other registering valve lands defining a variable restriction means communicating with said inlet port for developing a main valve element position feedback pressure;

valve passage means for distributing said feedback pressure to one side of said main control valve element;

and a solenoid actuator having an armature adapted to create a pilot valve element actuating force on said pilot valve element whereby said control valve element follows the displacement of said pilot valve element in response to variations in the force applied by said solenoid actuator;

one of said lands defining said variable area having a conical surface whereby the rate of change of said variable area upon adjustment relative to said sleeve is moderated.

5. A power steering system having a pressure operated fluid motor, a power steering pump, fluid flow passages between said pump and said fluid motor;

a manually operated steering valve means for controlling pressure distribution to said pressure operated mechanism;

second valve means comprising a main control valve element in one of said passages for controlling flow through said one passage including a flow inlet port and a flow outlet port;

said second valve means comprising also a fixed sleeve, said main control valve element and said sleeve having main registering lands defining a variable area orifice forming a flow path between said inlet port and said outlet port;

a pilot valve element, said pilot valve element and said main valve element having registering lands defining a variable restriction communicating with said inlet and outlet ports for developing a main control valve element position feedback pressure;

valve passage means for distributing said feedback pressure to one side of said main control valve element;

and a solenoid actuator having an armature adapted to create a pilot valve element actuating force on said pilot valve element whereby said control valve element follows the displacement of said pilot valve element in response to variations in the force applied by said solenoid actuator;

one of said lands defining said variable area having a conical surface whereby the rate of change of said variable area upon adjustment relative to said sleeve is moderated.

6. A fluid motor circuit for a wheeled vehicle having a positive-displacement, constant-flow pump, a pressure operated steering mechanism that responds to pressure developed by said pump and parallel high vehicle speed and low vehicle speed fluid flow passages between said pump and said pressure operated mechanism;

steering valve means in said passages for controlling pressure distribution to said pressure operated mechanism;

variable-orifice valve means comprising a main flow control valve element in one of said parallel passages for controlling the flow through said one passage and having a flow inlet port and a flow outlet port;

said variable-orifice valve means comprising also a fixed valve sleeve, said main valve element and said sleeve having main registering valve lands defining a variable-area orifice in said one passage;

a pilot valve element, said pilot valve element and said main control valve element having other registering lands defining a variable restriction communicating with said inlet and outlet ports for developing a main valve element position feedback pressure;

valve passage means for distributing said feedback pressure to one side of said main control valve element;

and a solenoid actuator having an armature adapted to create a pilot valve element actuating force on said pilot valve element whereby said control valve element follows the displacement of said pilot valve element in response to variations in the force applied by said solenoid actuator;

one of said lands defining said variable area having a conical surface whereby the rate of change of said variable area upon adjustment relative to said sleeve is moderated.

7. A fluid motor circuit having a pump, a pressure operated mechanism that responds to pressure developed by said pump and fluid flow passages between said pump and said pressure operated mechanism;

first valve means communicating with said passages for controlling pressure distribution to said pressure operated mechanism;

second valve means comprising a main flow control valve element in one of said passages for controlling flow through said one passage and having a flow inlet port and a flow outlet port;

said second valve means comprising also a pilot valve element and a valve sleeve, said main control valve element and said sleeve having main registering valve lands defining a variable-area orifice forming a flow path between said inlet port and said outlet port, said pilot valve element and said main valve element having other registering valve lands defining a variable restriction means communicating with said inlet port for developing a main valve element position feedback pressure;

valve passage means for distributing said feedback pressure to one side of said main control valve element;

and a solenoid actuator having an armature adapted to create a pilot valve element actuating force on said pilot valve element;

said pilot valve element being slidably disposed within said main valve element, said pilot valve element having spaced external valve lands and said main valve element having spaced internal valve lands, one axial side of said external lands communicating with said inlet port and the opposite axial side of said external lands communicating with said outlet port, and internal passage means communicating with the space between said pilot valve element lands for distributing pressure from a location between said pilot valve element lands to opposite sides of said pilot valve element and to one side of said main valve whereby said main valve follows the motion of said pilot valve element.

8. A power steering system having a pressure operated fluid motor, a power steering pump, fluid flow passages between said pump and said fluid motor;

a manually operated steering valve means for controlling pressure distribution to said pressure operated mechanism;

second valve means comprising a main control valve element in one of said passages for controlling flow through said one passage including a flow inlet port and a flow outlet port;

said second valve means comprising also a fixed sleeve, said main control valve element and said sleeve having main registering lands defining a variable area orifice forming a flow path between said inlet port and said outlet port;

a pilot valve element, said pilot valve element and said main control valve element having other registering lands defining a variable restriction communicating with said inlet and outlet ports for developing a main valve element position feedback pressure;

valve passage means for distributing said feedback pressure to one side of said main control valve element;

and a solenoid actuator having an armature adapted to create a pilot valve element actuating force on said pilot valve element;

said pilot valve element being slidably disposed within said main valve element, said pilot valve element having spaced external valve lands and said main valve element having spaced internal valve lands, one axial side of said external lands communicating with said inlet port and the opposite axial side of said external lands communicating with said outlet port, and internal passage means communicating with the space between said pilot valve element lands for distributing pressure from a location between said pilot valve element lands to opposite sides of said pilot valve element and to one side of said main valve element whereby said main valve follows the motion of said pilot valve element.

9. A fluid motor circuit for a wheeled vehicle having a positive-displacement, constant-flow pump, a pressure-operated mechanism that responds to pressure developed by said pump and parallel high vehicle speed and low vehicle speed fluid flow passages between said pump and said pressure operated mechanism;

steering valve means in said passages for controlling pressure distribution to said pressure operated mechanism;

variable-orifice valve means comprising a main flow control valve element in one of said parallel passages for controlling the flow through said one passage and having a flow inlet port and a flow outlet port;

said variable-orifice valve means comprising also a fixed valve sleeve, said main control valve element and said sleeve having main registering valve lands defining a variable area orifice in said one passage;

a pilot valve element, said pilot valve element and said main valve element having other registering lands defining a variable restriction communicating with said inlet and outlet ports for developing a main valve element position feedback pressure;

valve passage means for distributing said feedback pressure to one side of said main control valve element;

and a solenoid actuator having an armature adapted to create a pilot valve actuating force on said pilot valve element;

said pilot valve element being slidably disposed within said main valve element, said pilot valve element having spaced external valve lands and said main valve element having spaced internal valve lands, one axial side of said external lands communicating with said inlet port and the opposite axial side of said external lands communicating with said outlet port, and internal passage means communicating with the space between said pilot valve element lands for distributing pressure from a location between said pilot valve element lands to opposite sides of said pilot valve element and to one side of said main valve whereby s id main valve precisely follows the motion of said pilot valve element.

10. A fluid motor circuit having a pump, a pressure operated mechanism that responds to pressure developed by said pump and fluid flow passages between said pump and said pressure operated mechanism;

first valve means communicating with said passages for controlling pressure distribution to said pressure operated mechanism;

second valve means comprising a main flow control valve element in one of said passages for controlling flow through said one passage and having a flow inlet port and a flow outlet port;

said second valve means comprising also a pilot valve element and a valve sleeve, said main control valve element and said sleeve having main registering valve lands defining a variable area orifice forming a flow path between said inlet port and said outlet port, said pilot valve element and said main valve element having other registering valve lands defining a variable restriction means communicating with said inlet port for developing a main valve element position feedback pressure;

and a solenoid actuator having an armature adapted to create a pilot valve actuating force on said pilot valve whereby said control valve follows the displacement of said pilot valve in response to variations in the force applied by said solenoid actuator;

said pilot valve element being slidably disposed within said main valve element, said pilot valve element having spaced external valve lands and said main valve element having spaced internal valve lands, one axial side of said external lands communicating with said inlet port and the opposite axial side of said external lands communicating with said outlet port, and internal passage means communicating with the space between said pilot valve element lands for distributing pressure from a location between said pilot valve element lands to opposite sides of said pilot valve element and to one side of said main valve whereby said main valve follows the motion of said pilot valve element;

said pilot valve element lands overlapping registering internal valve lands in said main valve element, the pressure forces acting on said main valve element providing a displacement feedback for said main valve element as the degree of overlap of one set of pilot and main valve element lands with respect to the other set of said pilot and main valve element lands changes upon a change in the actuator force applied to said pilot valve element.

11. A power steering system having a pressure operated fluid motor, a power steering pump, fluid flow passages between said pump and said fluid motor;

a manually operated steering valve means for controlling pressure distribution to said pressure operated mechanism;

second valve means comprising a main control valve element in one of said passages for controlling flow through said one passage including a flow inlet port and a flow outlet port;

said second valve means comprising also a fixed sleeve, said main control valve element and said sleeve having main registering lands defining a variable area orifice forming a flow path between said inlet port and said outlet port;

a pilot valve element, said pilot valve element and said main valve element having other registering lands defining a variable restriction communicating with said inlet and outlet ports for developing a main valve element position feedback pressure;

and a solenoid actuator having an armature adapted to create a pilot valve actuating force on said pilot valve whereby said control valve precisely follows the displacement of said pilot valve element in response to variations in the force applied by said solenoid actuator;

said pilot valve being slidably disposed within said main valve element, said pilot valve element having spaced external valve lands and said main valve element having spaced internal valve lands, one axial side of said external lands communicating with said inlet port and the opposite axial side of said external lands communicating with said outlet port, and internal passage means communicating with the space between said pilot valve element lands for distributing pressure from a location between said pilot valve element lands to opposite sides of said pilot valve element and to one side of said main valve whereby said main valve precisely follows the motion of said pilot valve element;

said pilot valve element lands overlapping registering internal valve lands in said main valve element, the pressure forces acting on said main valve element providing a displacement feedback for said main valve element as the degree of overlap of one set of pilot and main valve element lands with respect to the other set of said pilot and main valve element lands changes upon a change in the actuator force applied to said pilot valve element.

12. A fluid motor circuit for a wheeled vehicle having a positive displacement, constant flow pump, a pressure operated mechanism that responds to pressure developed by said pump and parallel high vehicle speed and low vehicle speed fluid flow passages between said pump and said pressure operated mechanism;

steering valve means in said passages for controlling pressure distribution to said pressure operated mechanism;

variable-orifice valve means comprising a main flow control valve element in one of said parallel passages for controlling the flow through said one passage and having a flow inlet port and a flow outlet port;

said variable-orifice valve means comprising also a fixed valve sleeve, said main valve element and said sleeve having main registering valve lands defining a variable area orifice in said one passage;

a pilot valve element, said pilot valve element and said main valve element having other registering lands defining a variable restriction communicating with said inlet and outlet ports for developing a main valve element position feedback pressure;

and a solenoid actuator having an armature adapted to create an actuating force on said pilot valve element;

said pilot valve element being slidably disposed within said main valve element, said pilot valve element having spaced external valve lands and said main valve element having spaced internal valve lands, one axial side of said external lands communicating with said inlet port and the opposite axial side of said external lands communicating with said outlet port, and internal passage means communicating with the space between said pilot valve element lands for distributing pressure from a location between said pilot valve element lands to opposite sides of said pilot valve element and to one side of said main valve whereby said main valve precisely follows the motion of said pilot valve element;

said pilot valve element lands overlapping registering internal valve lands in said main valve element, the pressure forces acting on said main valve element providing a displacement feedback for said main valve element as the degree of overlap of one set of pilot and main valve element lands with respect to the other set of said pilot and main valve element lands changes upon a change in the actuator force applied to said pilot valve element.

13. The combination as set forth in claim 10 wherein said second valve means comprises a spring acting on said one side of said main control valve element for normally opening said second valve means.

14. The combination as set forth in claim 11 wherein said second valve means comprises a spring acting on said one side of said main control valve element for normally opening said second valve means.

15. The combination as set forth in claim 12 wherein said second valve means comprises a spring acting on said one side of said main control valve element for normally opening said second valve means.

* * * * *